United States Patent Office 3,506,564
Patented Apr. 14, 1970

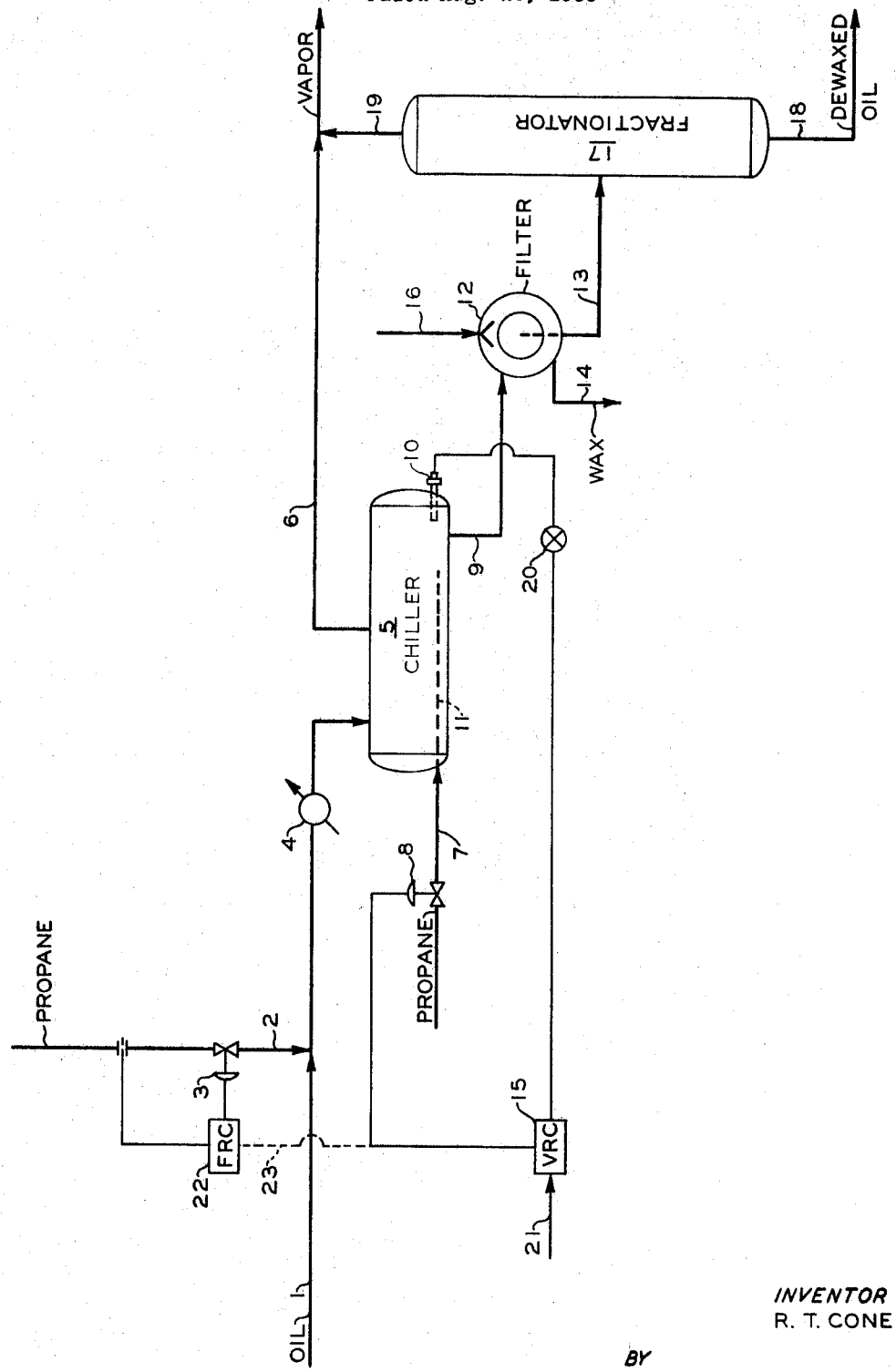

3,506,564
VISCOSITY CONTROL IN LIQUID-SOLIDS SYSTEMS
Roy T. Cone, Bartlesville, Okla., assignor to Phillips Petroleum Company, a corporation of Delaware
Filed Aug. 29, 1966, Ser. No. 575,823
Int. Cl. C10g 43/08
U.S. Cl. 208—33                                     4 Claims

ABSTRACT OF THE DISCLOSURE

The viscosity of liquid-solid mixtures to be separated is controlled by continuously determining the non-compensated viscosity at operating conditions and controlling the rate of solvent addition in response thereto.

---

This invention relates to the measurement and control of the viscosity of mixtures of liquids and solids and the control of processes where the viscosity of mixtures of liquids and solids is important. In one aspect, the viscosity of a mixture of liquids and solids is monitored at operating conditions and the viscosity of the mixture is controlled in response thereto. In another aspect, the addition of diluting liquid to liquid-solid mixtures is controlled in response to the viscosity of the mixtures at operating conditions. In another aspect, the viscosity of mixtures of solid paraffin wax and liquid hydrocarbon oil and solvent is monitored at operating conditions in a chilling zone and the rate of solvent addition to said zone is controlled in response to the viscosity of the mixture. In yet another aspect, the viscosity of mixtures of solid polymerization catalyst residue, hydrocarbon solvent and dissolved polymer is monitored at operating conditions prior to the separation thereof and the rate of solvent addition to said mixture is controlled in response to the measured viscosity of the mixture.

In the separation of solids from liquids, the maintenance of relatively low viscosity is generally advantageous whether the separation be accomplished by filtration, centrifugation, decantation or other means. The viscosity of such mixtures can be reduced either by increasing the temperature or by the addition of solvent to the mixture. However, in many applications it is desirable to maintain the temperature of the mixture at a relatively low value in order to minimize the solubility of the solid phase in the liquid phase. In such systems, therefore, the reduction in viscosity desired cannot be accomplished by increasing the temperature of the mixture, but rather must be accomplished by the addition of solvent. The feasibility of this latter approach depends upon at least two variables, those being the solubility of the solid phase in the solvent, and the apparatus and expended energy required to recover the solvent for reuse following the separation of the liquid and solids phases. As a result, the maintenance of the lowest possible viscosity is not usually the most desirable operation due to the expense of solvent handling and recovery. In a filtration process only a certain maximum quantity of liquids can be passed through the given filtering media, therefore excessive dilutions will limit effective productive capacity.

These considerations are particularly relevant for example in the dewaxing of hydrocarbon oils and the removal of polymerization catalyst residues from polymer and diluent.

Hydrocarbon oil dewaxing is usually accomplished by chilling solutions of hydrocarbon oils within the lubricating oil range containing paraffinic hydrocarbon wax with solvent to effect the precipitation of the paraffin wax prior to filtration. Obviously, the ease and efficiency of the separation accomplished in the filtration zone is a function of both the viscosity of the liquid phase and the solubility of the hydrocarbon wax therein. Due to the nature of these variables, the steps required to optimize each necessarily conflict in that the reduction of operating temperatures to minimize solubility of the wax in the liquid phase substantially increases the viscosity of the liquid phase, which should be maintained at a relatively low value to optimize the desired separation. In conventional solvent dewaxing operations this reduction of viscosity is accomplished by the addition of a volatile hydrocarbon solvent such as propane which serves the additional function of autorefrigerating the mixture to operating temperatures in the range of about −20 to about −50° F. This cooling effect is accomplished by vaporizing, in part, the propane solvent in a chilling zone after which it is recovered and recycled. The propane solvent that remains in the liquid phase through the filtration zone must also be separated from the lubricating oil product and recycled along with propane recovered from the chilling operation. Due to the amount of propane utilized in such operations, and the consequent expense of recovery and recycle, it is preferred to establish an optimum temperature and viscosity in the chilling and filtration zones which provide the most desirable balance between ease and efficiency of separation and expense of solvent recovery and recycle.

Similarly, in the recovery of insoluble polymerization catalyst residues from polymer cements or slurries comprising polymer and usually a hydrocarbon diluent, it is advantageous to control the viscosity of the solution during the filtration or other similar physical separation. For example, in the production of homogeneous polyethylene cements in hydrocarbon diluents by polymerizing ethylene in the presence of a catalyst comprising chromium oxide, the catalyst residues can be recovered as a solid by filtration, regenerated, and recycled. Such a procedure also provides a means for removing objectionable contaminants from the polymer cement prior to flashing thereof to recover polymer. The viscosity of such polymer cements is usually very high and it has been found useful to dilute the mixture of catalyst residue and cement prior to filtration in order to achieve more efficient and rapid separation. However, as in the case of lubricating oil dewaxing, the amount of dilution utilized prior to filtration of the polymer cement is preferably controlled in order to maintain a predetermined optimum viscosity in the filtration zone while limiting the amount of solvent employed to avoid excessive expense for solvent recovery and recycle.

It is therefore an object of this invention to provide a method for optimizing the control of viscosity of liquid-solid systems prior to and during separation. It is another object of this invention to provide a method for controlling the amount of solvent addition to liquid-solid systems to improve the speed and efficiency of the separation of such mixtures.

Other aspects, objects and advantages of this invention will be apparent upon study of the disclosure, the drawing and the appended claims.

In accordance with one embodiment of this invention I have found that liquid-solid separation systems employing the addition of diluent prior to separation in order to improve the ease and efficiency thereof can be optimized by continuously monitoring the viscosity of the mixtures to be filtered at operating conditions and controlling the amount of solvent addition thereto in response to such viscosity determination.

In accordance with another embodiment of this invention, the separation of hydrocarbon wax from a liquid phase comprising lubricating oil stocks and solvent in a solvent dewaxing operation can be optimized by continuously monitoring viscosity of the liquid-solid mixture in the chilling zone prior to separation and controlling the amount of solvent addition to the slurry in response to such viscosity determination in order to maintain the viscosity in the chilling zone at a predetermined optimum value.

In accordance with yet another embodiment of this invention, the separation of solid polymerization catalyst residues from polymer cements or slurries can be improved by adding additional solvent thereto in order to control viscosity of the mixture, continuously monitoring this viscosity at operating conditions prior to separation and controlling the amount of solvent addition in response to such viscosity determination in order to maintain the viscosity within a predetermined optimum range.

The concept of this invention can be best illustrated by its description with reference to the drawing which is an illustration of the adaptation of this concept to the propane dewaxing of hydrocarbon lubricating oils.

As illustrated in the drawings, hydrocarbon lubricating oil is passed by way of pipe 1 into admixture with propane which enters the system by pipe 2 as controlled by control valve 3. The mixture is then cooled in suitable heat exchange means 4 and passed to a chilling zone 5 wherein the temperature of the mixture that enters the chilling zone at approximately 75° F. is further reduced to within the range of about −20° F. to about −50° F. due to the vaporization of a part of the propane in the solution. Additional propane can be added to chiller 5 by way of pipe 7 as controlled by control means 8. This additional propane is desirably distributed evenly throughout chiller 5 by suitable distribution means 11 to effect vaporization thereof commensurate with the pressure in the vessel and the consequent reduction of the temperature of the oil-solvent-wax mixture to the desired level. The vaporization also furnishes agitation for thorough mixing of the makeup propane.

At these operating conditions, paraffin wax is precipitated in chiller 5 to form a slurry which is removed by way of pipe 9 and passed to suitable separation means such as rotary filter 12 wherein the wax and oil are separated by filtration of liquid therefrom; the wax is washed, drained and blown from the filter cloth and is removed by way of pipe 14 and passed to further processing or collection means. Dewaxed oil and propane are removed from filter 12 by way of pipe 13 and passed to fractionation or flash facility 17 wherein propane is removed as overhead by way of pipe 19 and admixed with propane removed from chiller 5 by way of pipe 6 and passed to solvent recovery and recycle facilities. Dewaxed oil being substantially free of propane solvent is removed as bottom product by way of pipe 18 to collection or further processing means.

It is generally desirable to wash the filter cake in a rotary filter 12 with additional propane solvent which enters the filter by way of pipe 16. This additional solvent propane usually comprises only a minor amount of the total solvent added to the system; the major proportion of propane solvent being admixed with the oil feed to the chiller.

The viscosity of the wax-oil suspension in the chiller is continuously monitored at operating conditions by a non-temperature-compensated viscosimeter 10 to provide a continuous indication of the viscosity of the slurry passed to the filtration zone. The signal thus derived is passed to recorder controller 15 wherein it is compared to a predetermined set point indicative of the optimum viscosity at the chiller exit. The resulting deviation between the viscosimeter signal and the base point is utilized to reset controller 15 to modify the setting of flow control valve 8 to vary the rate of addition of propane through pipe 7 in a predetermined manner. Consequently, when the viscosity in chiller 5 falls below the desired level indicating that an unnecessarily high amount of solvent is being added to the system, control valve 8 will be reset to reduce the rate of propane addition to the feed. Similarly, when the viscosity in chiller 5 as monitored by continuous viscosimeter 10 rises above the predetermined optimum value, control valve 8 is opened by an amount related to the magnitude and duration of the deviation between the recorded and optimum viscosities so as to increase the rate of propane addition to the feed.

It is generally desirable to introduce the solvent propane via line 2, to make up the so-called warm solution, under some form of flow control such as a rate of flow controller 22 as shown operably connected to its sensing element and to valve 3. The set point 23 to this controller may be introduced manually or may be transmitted from another instrument such as a ratio relay or controller so as to cause this feed propane addition to be manipulated responsive to another process variable, such as the rate of flow of feed oil.

In situations where a relatively fixed propane-to-oil ratio in the warm solution is desired, and considerable autorefrigeration cooling of the batch charge of propane and oil is to be conducted, the flow rate of liquid propane to be recycled following condensation of vapors withdrawn via lines 6 and 19 to the chiller, via line 7 regulated by valve 8, will be sufficiently large to be effectively manipulated by viscosity recorder controller 15, so as to maintain the viscosity demanded by set point 21 of the liquid contents of chiller 5 as measured by probe 10, during the entire chilling cycle of the batch charge.

In other process situations, if relatively little propane (or the solvent in other dewaxing processes) is to be added by line 7 during the batch or continuous operation whereby the solutions' temperature and/or composition (or property related thereto) are adjusted before separation of solid material therefrom, effective viscosity control may not be possible by simple manipulation of valve 8 in line 7. Then, the control signal from viscosity recorder controller 15 may be transmitted to flow recorder controller 22 as the set point 23 thereto instead of to valve 8 so as to obtain the proper viscosity in chiller 5 by at least limited regulation of propane feed through line 2 by valve 3 to form the warm solution.

If desired, a cascade control system similar to that comprising controllers 15 and 22 may be employed to operate valve 8 in line 7. Thereby a dual, split range, or limited set point type of control may be imposed from viscosity measurement 10 and controller 15 onto both propane streams 2 and 7.

Several continuous viscosimeters have been found suitable in this application. For example, the Dynatrol CL–10RV series viscosity detector illustrated in Dynatrol Bulletin No. J64–V and the Bendix Corporation Ultraviscoson continuous viscosimeter are readily adaptable to this application.

The system as described automatically maintains the viscosity of the slurry passed to the filtration zone at a predetermined optimum value regardless of variations in the viscosity of the hydrocarbon feedstock, the wax content and composition thereof, and operating temperature in the chiller and filtration zone. As a result, the effectiveness of filtration is maintained while the use of unnecessarily high amounts of propane diluent is avoided.

The application of the concept of this invention to the recovery of polymerization catalyst residues from polymer solutions is quite similar to that described for propane dewaxing operations, and the apparatus required would, in function, be analogous to that illustrated in the drawing. For example, a polyethylene polymer solution comprising about 6 weight percent polyethylene dissolved in hydrocarbon diluent and containing about .006 weight percent catalyst such as chromium oxide on a support such as silica, alumina, zirconia, silica-alumina, etc., would be passed by way of pipe 1 into admixture with diluent entering the system by pipe 2 and the mixture passed to a suitable filter feed vessel 5 wherein the viscosity is continuously monitored by viscosimeter probe 10. The mixture would then be passed by way of pipe 9 to filter 12 wherein solid materials collected as filter cake are removed by way of pipe 14 and polymer solution comprising polymer and diluent are recovered and flashed or steam stripped to effect their separation. In this operation, dilution of the polymer solution to a concentration of about 4 percent is contemplated with control valve 3 governing the rate of solvent addition to the polymer feed. The direction of control action is the same as that described with reference to the propane dewaxing operation, however, the temperature and/or concentration adjustment steps by exchanger 4 and by autorefrigeration lines 6 and 7 may be practiced or eliminated as desired.

Obviously, there are numerous other applications of this viscosity control system to the separation of liquid-solids systems. The illustrations presented herein are only intended to be indicative of the application of this concept and should not be construed to limit its application. Illustrative of the polymer systems that can be separated by this method are those discussed in U.S. Patents 2,930,787 and 2,970,990. The diluents usually preferred in these applications are hydrocarbons having from 3–12 carbon atoms.

EXAMPLE

As an example of the application of this invention to optimize the operating efficiency of the dewaxing of a lubricating oil blending stock, 3600 barrels per day of a solvent-extracted mineral oil (petroleum) fraction characterized by its viscosity of 55 Saybolt Seconds Universal at 210° F. is dissolved in 4680 barrels per day of substantially pure propane at about 141° F., thereafter being cooled to about 90° F. This so-called "warm solution" is charged in batches of about 120 barrels to the autorefrigerated chiller for temperature reduction to about $-37°$ F. so as to precipitate paraffin wax in a filterable form. A minor concentration of a commercially-available filter aid is added to the warm solution to promote wax crystal growth and filterability. The solvent to oil volumetric ratio of the warm solution is 1.30 to 1 and the solution viscosity is 0.45 centipoise at the 79° F. temperature, 107 p.s.i.g. pressure when charged to the chiller.

As the result of reduction of the pressure gradually to about 0 p.s.i.g. in the chiller and the consequent evaporation of propane therefrom as dictated by its vapor pressure-temperature relationship, the temperature is lowered within a period of about 17 minutes to $-37°$ F. causing wax crystals to precipitate from the propane-oil solution. The propane vapors removed by evaporation are compressed, condensed and this liquid together with additional liquid propane is recycled to the chiller and reintroduced through the distribution pipe in the bottom portion of the chiller.

At the initiation of the chilling cycle, the flow rate of the recycled propane to the chiller via the distributor is automatically controlled by the viscosity regulating system of FIGURE 1. Non-temperature-compensated viscosity probe 10 continuously determines the viscosity of the propane-oil-wax mixture, this value being transduced and transmitted to controller 15 from transmitter 20. A desired viscosity set point 21 of 1.0 centipoise is applied to viscosity recorder controller 15 for comparison therein with the measured value from 10–20. As the result of this comparison, a control signal responsive to the difference between these two values is generated and is applied to manipulate the relative opening of control valve 8 in line 7 to regulate the flow rate of recycled propane to the chiller so as to achieve and maintain the desired viscosity of 1.0 centipoise in chiller 5 in the face of uncertain viscosity increases (if no control were used) resulting from propane removal by evaporation and reduction in mixture temperature.

As the result of this control, the mixture is maintained substantially at this desired, predetermined optimum, viscosity during the chilling cycle thereby allowing the maximum volume of oil to be chilled for dewaxing per batch charged without the mixture becoming overly viscous and creating problems in mixing, heat transfer and wax crystal growth. Of perhaps even greater importance, the mixture's viscosity at the end of the chilling cycle is optimum as regards its filtration for wax removal, again allowing maximum throughput of oil at tolerable filtration rates in consideration of filtration differential pressures (about 5 p.s.i.) available.

The solvent to oil volumetric ratio in the filter feed is increased to about 2.20 to 1 (from the warm solution ratio of 1.30 to 1) to maintain the viscosity constant. This requires a net addition of about 3240 barrels per day of propane to the daily warm solution charge, or about 46 barrels per batch processed through each chilling-filtration cycle.

About 540 barrels per day of wax is removed from the 3600 barrels per day oil charge, the dewaxed propane free oil possessing a pour point of about $+5°$ F. and further characterized by a viscosity of about 54.0 Saybolt Seconds Universal at 210° F.

Reasonable variation and modification are possible within the scope and intent of the disclosure, drawing, and the appended claims to the invention, the essence of which is that there is provided a method for controlling the viscosity of liquid-solid systems to be separated by continuously monitoring their viscosity without compensation for changing operating conditions, and controlling the addition of solvent thereto in response to such viscosity determination.

I claim:

1. A process for separating mixtures of liquid and solid materials comprising paraffinic hydrocarbon wax wherein said liquid comprises a volatile hydrocarbon solvent and soluble material comprising a hydrocarbon within the lubricating oil range dissolved therein comprising passing said mixture to a chilling zone wherein said paraffinic hydrocarbon wax is caused to precipitate, directly monitoring the viscosity of said mixture at operating conditions in said chilling zone, controlling the addition of solvent to said mixture in response to said viscosity, and separating said precipitated paraffinic hydrocarbon wax from the mixture of said solvent and said lubricating oil range hydrocarbon.

2. The method of claim 1 wherein said solvent is propane, and said viscosity is measured in a chilling zone wherein said paraffinic hydrocarbon wax is caused to precipitate prior to its separation from the mixture of said solvent and said lubricating oil range hydrocarbon due to the vaporization of a part of the propane in the solution which autorefrigerates the mixture.

3. The method of claim 2 wherein the chilled mixture is removed from said chilling zone and passed to a filtration zone to remove precipitated wax from the mixture, and the solution of propane and lubricating oil range hydrocarbon remaining after wax removal are separated into a propane fraction and a lubricating oil range hydrocarbon fraction.

4. The method of claim 3 wherein said separated propane fraction and the vaporized propane in the chilling zone are recovered and recycled to the chilling zone and wherein the rate of recycle to the chilling zone is controlled responsive to said viscosity measurement.

References Cited

UNITED STATES PATENTS

| 2,233,561 | 3/1941 | Kalle | 73—54 |
| 2,737,469 | 3/1956 | Anderson et al. | 196—14.52 |
| 2,905,616 | 9/1959 | Moore et al. | 208—35 |
| 3,285,846 | 11/1966 | King et al. | 208—36 |
| 3,163,172 | 12/1964 | Buzzard | 73—54 |

HERBERT LEVINE, Primary Examiner

U.S. Cl. X.R.

73—54; 196—14.5; 208—35